(12) United States Patent
Pollmann

(10) Patent No.: US 11,150,758 B2
(45) Date of Patent: Oct. 19, 2021

(54) PRESSURE ACTIVATED ACCURATE POINTING

(71) Applicant: Wacom Co., Ltd., Saitama (JP)

(72) Inventor: Konrad Wilhelm Pollmann, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/818,956

(22) Filed: Mar. 13, 2020

(65) Prior Publication Data

US 2021/0286460 A1 Sep. 16, 2021

(51) Int. Cl.
| | |
|---|---|
| *G06F 3/0346* | (2013.01) |
| *G06F 3/041* | (2006.01) |
| *G06F 3/0484* | (2013.01) |
| *G06F 3/0354* | (2013.01) |

(52) U.S. Cl.
CPC ........ *G06F 3/0414* (2013.01); *G06F 3/03545* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 2015/0138126 | A1* | 5/2015 | Westerman | ........... G06F 3/0414 345/173 |
| 2017/0357403 | A1* | 12/2017 | Geary | ................... G06F 3/0414 |
| 2020/0264763 | A1* | 8/2020 | Kobayashi | .......... G06F 3/04817 |

* cited by examiner

*Primary Examiner* — Amr A Awad
*Assistant Examiner* — Donna V Bocar
(74) *Attorney, Agent, or Firm* — Seed IP Law Group LLP

(57) ABSTRACT

A method includes obtaining sensor coordinates and pressure values corresponding to the sensor coordinates; mapping, using a first mapping method, a first set of the sensor coordinates to first display screen coordinates; determining that a first one of the pressure values is greater than or equal to a threshold pressure value; determining that a second one of the pressure values is less than the threshold pressure value, after determining that the first one of the pressure values is greater than or equal to the threshold pressure value; in response to the determining that the second one of the pressure values is less than the threshold pressure value, mapping, using a second mapping method, a second set of the sensor coordinates to second display screen coordinates; and outputting the first display screen coordinates and the second display screen coordinates. Accordingly, an operator can easily switch the mapping to the second method.

17 Claims, 9 Drawing Sheets

PRESSURE ACTIVATED ACCURATE POINTING

BACKGROUND

Technical Field

The present disclosure relates to inputting of information to an electronic device, and more particularly to changing to a mode of the electronic device from a standard mode to an accurate mode in which information can be input more precisely than in the standard mode.

Description of the Related Art

Digital artists are frequently required to place a cursor with pixel-level accuracy, for example, when using a pointing device such as an electronic pen to perform a drag operation that defines a selection box, to move objects into very specific positions, and more. Digital artists working in vector applications or three-dimensional (3D) environments typically face this need even more frequently.

When an electronic pen is used to move control points or vector elements, most operators apply a stable pressure on tip of the pen (i.e., pressure that they feel comfortable with and that they feel gives them good control). Some operators slightly increase the pressure on the tip in the moment before they release the tip (i.e., move the tip of the electronic pen away from a position detecting sensor such that no pressure is applied to the tip of the electronic pen), presumably in a desire to have more control over the pen tip position. Once an operator feels confident that the screen cursor is at the desired pixel location, the pen pressure is typically released in one quick action.

Considering the ever-increasing resolutions of display devices, a human hand is challenged to point and release a pen tip with as much precision as is needed for pixel-level accurate placement of nodes and control points. One way to address this challenge is use of a "Precision Mode". Such a Precision Mode may be activated by depressing a key (e.g., ExpressKey) on a tablet computer. Once activated, a Precision Mode overlay is placed over a monitor image to alert the operator to a change in modes, and mapping of the pen tip positions to screen cursor positions is scaled by a scaling factor (e.g., a scaling factor of 2 or more). For example, a 5 mm pen movement on an Intuos Pro Professional Pen & Touch Tablet from Wacom might result in a 12 mm cursor movement on a 24" monitor in a normal mode and, when the Precision Mode is activated, the pen may have to move 10, 15, or 25 mm to achieve the same amount of screen cursor movement (depending on the precision mode setting). This allows for much finer pointing of a screen cursor, and much easier selection of individual pixels.

However, pressing a button (e.g., ExpressKey) on a tablet computer or an electronic pen to activate the Precision Mode slows down an operator's workflow (especially because most operators have pen buttons assigned to other functions and have their secondary hand resting on a keyboard, not next to the button), and therefore the Precision Mode is rarely used by professionals. Accordingly, there is a need to provide quick and intuitive access to an accurate pointing mode that achieves the same result as the precision mode.

BRIEF SUMMARY

According to the present disclosure, pen navigation works normally for a range of tip pressures normally used for standard pointing, dragging, and clicking operations. When an operator needs to precisely position and release a node or control point, the operator lowers the tip pressure below a certain Pressure Activated Accurate Pointing (PAAP) activation threshold to activate an accurate pointing mode. From the moment and location that the accurate pointing mode is activated, a screen cursor moves proportionally to but significantly "slower" than the pen tip moves. On a display device, the screen cursor will no longer follow the pen tip but will lag behind it. This allows for very fine positioning of the screen cursor and a very accurate tip release. According to the present disclosure, an operator can change the mode of an electronic device to the accurate pointing mode and perform accurate inputting of information to the electronic device using a single hand in a manner that cannot be accomplished using conventional technology.

A method according to the present disclosure may be summarized as including: obtaining a plurality of sensor coordinates, and a plurality of pressure values respectively corresponding to the plurality of sensor coordinates; mapping, using a first mapping method, a first set of the plurality of sensor coordinates to a first plurality of display screen coordinates; outputting the first plurality of display screen coordinates; determining that a first one of the plurality of pressure values is greater than or equal to a threshold pressure value; determining that a second one of the plurality of pressure values is less than the threshold pressure value, after the determining that the first one of the plurality of pressure values is greater than or equal to the threshold pressure value; in response to the determining that the second one of the plurality of pressure values is less than the threshold pressure value, mapping, using a second mapping method, a second set of the plurality of sensor coordinates to a second plurality of display screen coordinates; and outputting second plurality of display screen coordinates. The second mapping method is different from the first mapping method, and the second set of the plurality of sensor coordinates is different from the first set of the plurality of sensor coordinates.

The plurality of sensor coordinates may correspond to a plurality of positions on a sensor pointed to by an electronic pen, and the plurality of pressure values may correspond to a plurality of pressures applied to a pen tip of the electronic pen.

The method may further include, in response to the determining that the second one of the first plurality of pressure values is less than the threshold pressure value, determining that a velocity of the electronic pen is less than a threshold velocity value, and the mapping, using the second mapping method, of the second set of the plurality of sensor coordinates to the second plurality of display screen coordinates is in response to the determining that the velocity of the electronic pen is less than the threshold velocity value. The first set of the plurality of sensor coordinates, which is mapped using the first mapping method to the first plurality of display screen coordinates, may indicate that the electronic pen moves a first distance on the sensor, the first plurality of display screen coordinates may correspond to a first distance on the display screen, the first distance on the sensor may be less than or equal to the first distance on the display screen, the second set of the plurality of sensor coordinates, which is mapped using the second mapping method to the second plurality of display screen coordinates, may indicate that the electronic pen moves a second distance on the sensor, the second plurality of display screen coordinates may correspond to a second distance on the display screen, and the second distance on the sensor may be greater than the second distance on the display screen.

The method may include displaying a cursor on the display screen based on the first plurality of display screen coordinates; and displaying the cursor on the display screen based on the second plurality of display screen coordinates. The first set of the plurality of sensor coordinates, which is mapped using the first mapping method to the first plurality of display screen coordinates, may indicate that the electronic pen moves at a first velocity on the sensor, the displaying of the cursor on the display screen based on the first plurality of display screen coordinates may include moving the cursor at a first velocity on the display screen, the first velocity at which the electronic pen moves on the sensor may be less than equal to the first velocity at which the cursor moves on the display screen, the second set of the plurality of sensor coordinates, which is mapped using the second mapping method to the second plurality of display screen coordinates, may indicate that the electronic pen moves at a second velocity on the sensor, the displaying of the cursor on the display screen based on the second plurality of display screen coordinates may include moving the cursor at a second velocity on the display screen, and the second velocity at which the electronic pen moves on the sensor may be greater than the second velocity at which the cursor moves on the display screen.

The method may further include: determining that a third one of the plurality of pressure values is greater than or equal to the threshold pressure value, after the determining that the second one of the plurality of pressure values is less than the threshold pressure value; in response to the determining that the third one of the plurality of pressure values is greater than or equal to the threshold pressure value, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

The method may further include: determining that a third one of the plurality of pressure values is equal to zero, after the determining that the second one of the plurality of pressure values is less than the threshold pressure value; in response to the determining that the third one of the plurality of pressure values is equal to zero, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

Another method according to the present disclosure may be summarized as including: obtaining a plurality of sensor coordinates, and a plurality of pressure values respectively corresponding to the plurality of sensor coordinates; mapping, using a first mapping method, a first set of the plurality of sensor coordinates to a first plurality of display screen coordinates; and outputting the first plurality of display screen coordinates; determining that a first one of the plurality of pressure values is greater than or equal to a first threshold pressure value; determining that a second one of the plurality of pressure values is less than or equal to a second threshold pressure value, after the determining that the first one of the plurality of pressure values is greater than or equal to the first threshold pressure value; in response to the determining that the second one of the plurality of pressure values is less than or equal to the second threshold pressure value, mapping, using a second mapping method, a second set of the plurality of sensor coordinates to a second plurality of display screen coordinates; and outputting the second plurality of display screen coordinates. The second threshold pressure value is less than the first threshold pressure value, the second mapping method is different from the first mapping method, and the second set of the plurality of sensor coordinates is different from the first set of the plurality of sensor coordinates.

The plurality of sensor coordinates may correspond to a plurality of positions on a sensor pointed to by an electronic pen, and the plurality of pressure values corresponds to a plurality of pressures applied to a pen tip of the electronic pen.

The method may include, in response to the determining that the second one of the plurality of pressure values is less than or equal to the second threshold pressure value, determining that a velocity of the electronic pen is less than a threshold velocity value. The mapping, using the second mapping method, of the second set of the plurality of sensor coordinates to the second plurality of display screen coordinates is in response to the determining that the velocity of the electronic pen is less than the threshold velocity value.

The first set of the plurality of sensor coordinates, which is mapped using the first mapping method to the first plurality of display screen coordinates, may indicate that the electronic pen moves a first distance on the sensor, the first plurality of display screen coordinates may correspond to a first distance on the display screen, the first distance on the sensor may be less than or equal to the first distance on the display screen. The second set of the plurality of sensor coordinates, which is mapped using the second mapping method to the second plurality of display screen coordinates, may indicate that the electronic pen moves a second distance on the sensor. The second plurality of display screen coordinates may correspond to a second distance on the display screen. The second distance on the sensor may be greater than the second distance on the display screen.

The method may include displaying a cursor on the display screen based on the first plurality of display screen coordinates; and displaying the cursor on the display screen based on the second plurality of display screen coordinates. The first set of the plurality of sensor coordinates, which is mapped using the first mapping method to the first plurality of display screen coordinates, may indicate that the electronic pen moves at a first velocity on the sensor. The displaying of the cursor on the display screen based on the first plurality of display screen coordinates may include moving the cursor at a first velocity on the display screen. The first velocity at which the electronic pen moves on the sensor may be less than or equal to the first velocity at which the cursor moves on the display screen. The second set of the plurality of sensor coordinates, which is mapped using the second mapping method to the second plurality of display screen coordinates, may indicate that the electronic pen moves at a second velocity on the sensor. The displaying of the cursor on the display screen based on the second plurality of display screen coordinates may include moving the cursor at a second velocity on the display screen. The second velocity at which the electronic pen moves on the sensor may be greater than the second velocity at which the cursor moves on the display screen.

The method may further include: determining that a third one of the plurality of pressure values is greater than or equal to the first threshold pressure value, after the determining that the second one of the plurality of pressure values is less than or equal to the second threshold pressure value; in response to the determining that the third one of the plurality of pressure values is greater than or equal to the first threshold pressure value, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

The method may further include: determining that a third one of the plurality of pressure values is equal to zero, after the determining that the second one of the plurality of pressure values is less than or equal to the second threshold pressure value; in response to the determining that the third one of the plurality of pressure values is equal to zero, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

A non-transitory processor-readable storage medium according to the present disclosure may be summarized storing instructions that, when executed by a processor, cause the processor to: obtain a plurality of sensor coordinates, and a plurality of pressure values respectively corresponding to the plurality of sensor coordinates; map, using a first mapping method, a first set of the plurality of sensor coordinates to a first plurality of display screen coordinates; output the first plurality of display screen coordinates; determine that a first one of the plurality of pressure values is greater than or equal to a threshold pressure value; determine that a second one of the plurality of pressure values is less than the threshold pressure value, after the first one of the plurality of pressure values is determined to be greater than or equal to the threshold pressure value; in response to the second one of the plurality of pressure values being determined to be less than the threshold pressure value, map, using a second mapping method, a second set of the plurality of sensor coordinates to a second plurality of display screen coordinates; and output the second plurality of display screen coordinates. The second mapping method is different from the first mapping method, and the second set of the plurality of sensor coordinates is different from the first set of the plurality of sensor coordinates.

The plurality of sensor coordinates may correspond to a plurality of positions on a sensor pointed to by an electronic pen, and the plurality of pressure values may correspond to a plurality of pressures applied to a pen tip of the electronic pen.

The instructions, when executed by the processor, may cause the processor to, in response to the second one of the plurality of pressure values being determined to be less than the threshold pressure value, determine that a velocity of the electronic pen is less than a threshold velocity value. The second set of the plurality of sensor coordinates is mapped, using the second mapping method, to the second plurality of display screen coordinates in response to the velocity of the electronic pen being determined to be less than the threshold velocity value.

the first set of the plurality of sensor coordinates mapped, using the first mapping method, to the first plurality of display screen coordinates may indicate that the electronic pen moves a first distance on the sensor. The first plurality of display screen coordinates may correspond to a first distance on the display screen. The first distance on the sensor may be equal to the first distance on the display screen. The second set of the plurality of sensor coordinates mapped, using the second mapping method, to the second plurality of display screen coordinates may indicate that the electronic pen moves a second distance on the sensor. The second plurality of display screen coordinates may correspond to a second distance on the display screen. The second distance on the sensor may be greater than the second distance on the display screen.

The instructions, when executed by the processor, may cause the processor to: display a cursor on the display screen based on the first plurality of display screen coordinates; and display the cursor on the display screen based on the second plurality of display screen coordinates. The first set of the plurality of sensor coordinates, which is mapped using the first mapping method to the first plurality of display screen coordinates, may indicate that the electronic pen moves at a first velocity on the sensor. The cursor may be displayed on the display screen based on the first plurality of display screen coordinates by moving the cursor at a first velocity on the display screen. The first velocity at which the electronic pen moves on the sensor may be less than or equal to the first velocity at which the cursor moves on the display screen. The second set of the plurality of sensor coordinates, which is mapped using the second mapping method to the second plurality of display screen coordinates, may indicate that the electronic pen moves at a second velocity on the sensor. The cursor may be displayed on the display screen based on the second plurality of display screen coordinates by moving the cursor at a second velocity on the display screen. The second velocity at which the electronic pen moves on the sensor may be greater than the second velocity at which the cursor moves on the display screen.

The instructions, when executed by the processor, cause the processor to: determine that a third one of the plurality of pressure values is greater than or equal to the threshold pressure value, after the second one of the plurality of pressure values is determined to be less than the threshold pressure value; in response to the third one of the plurality of pressure values being determined to be greater than or equal to the threshold pressure value, map, using the first mapping method, a third set of the plurality of sensor coordinates to a third plurality of display screen coordinates; and output the third plurality of display screen coordinates. The third set of the plurality of sensor coordinates is different from the first set and the second set of the plurality of sensor coordinates The instructions, when executed by the processor, may cause the processor to: determine that a third one of the plurality of pressure values is equal to zero, after the second one of the plurality of pressure values is determined to be less than the threshold pressure value; in response to the third one of the plurality of pressure values being determined to be equal to zero, map, using the first mapping method, a third set of the plurality of sensor coordinates to a third plurality of display screen coordinates; and output the third plurality of display screen coordinates. The third set of the plurality of sensor coordinates is different from the first set and the second set of the plurality of sensor coordinates.

The instructions, when executed by the processor, may cause the processor to: display a cursor on the display screen based on the first plurality of display screen coordinates; and display the cursor on the display screen based on the second plurality of display screen coordinates. At least part of the display screen may be displayed in an enlarged manner while the cursor is displayed on the display screen based on the second plurality of display screen coordinates compared to a manner in which the at least part of the display screen is displayed while the cursor is displayed on the display screen based on the first plurality of display screen coordinates.

DETAILED DESCRIPTION

Figure 1:
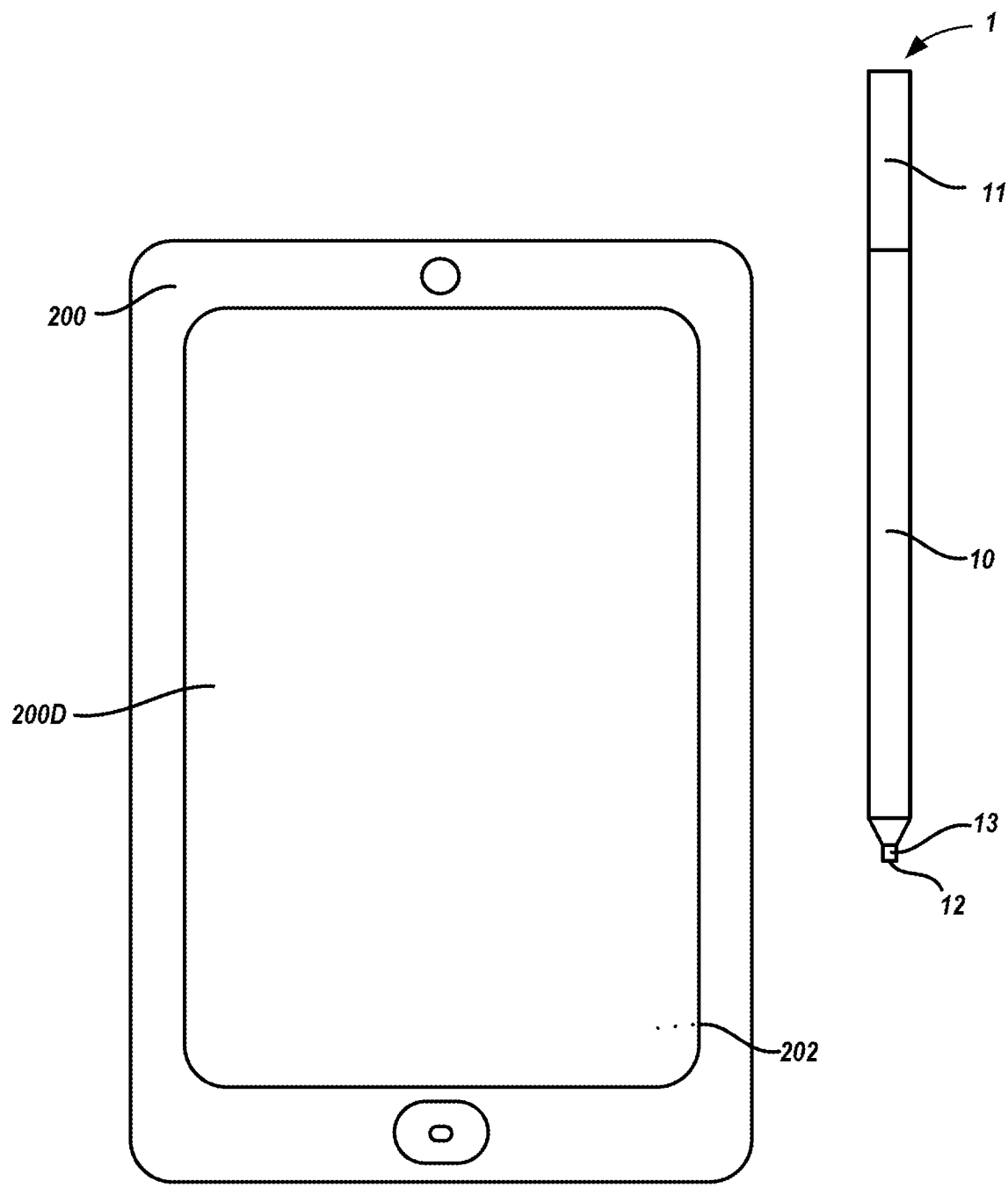
FIG. 1 is a diagram illustrating examples of an electronic device and an electronic pen according to one or more embodiments of the present disclosure.

FIG. 1 is a view illustrating examples of an electronic device 200 and an electronic pen 1. The electronic device 200 is a tablet computer including a display screen 200D of a display device, for example, a liquid crystal display (LCD) device, and includes an electromagnetic induction position detecting device 202 in the lower portion (rear side) of the display screen 200D. Although the electronic device 200 shown in FIG. 1 is a tablet computer, the electronic device 200 may be, for example, a personal computer coupled to a monitor and a position detector that detects the position of an electronic pen (e.g., Intuos Pro Professional Pen & Touch Tablet from Wacom).

An operator performs position indicating operations on an input surface of the display screen 200D. In the electronic device 200, when a position indicating operation is performed on the display screen 200D with the electronic pen 1, the position detecting device 202, which is provided on the rear side of the display screen 200D, detects a position at which the position indicating operation is made with the electronic pen 1, and a corresponding pen pressure. In one or more embodiments, a microcomputer of the position detecting device 202 of the electronic device 200 performs display processing depending on the indicated position and the corresponding pen pressure on the display screen 200D.

In one or more embodiments, a host processor 43 (see FIG. 2) of the electronic device 200 performs display processing depending on the indicated position and the corresponding pen pressure on the display screen 200D.

In the electronic pen 1, in a hollow portion of a tubular casing 10 made of resin, for example, a plurality of parts of the electronic pen 1 is arranged and housed in the axial direction. Moreover, the tubular casing 10 is tapered toward one end and has an opening (not illustrated in FIG. 1) formed in the end portion of the tubular casing 10. A distal end portion 12 of a bar-like core body 13 is exposed through the opening as a pen point or pen tip. The distal end portion 12 of the bar-like core body 13 functions as a pen tip of the electronic pen 1. In addition, a side opposite to the pen tip side of the casing 10 is closed with a casing cap 11 fitted to the casing 10.

Figure 2:
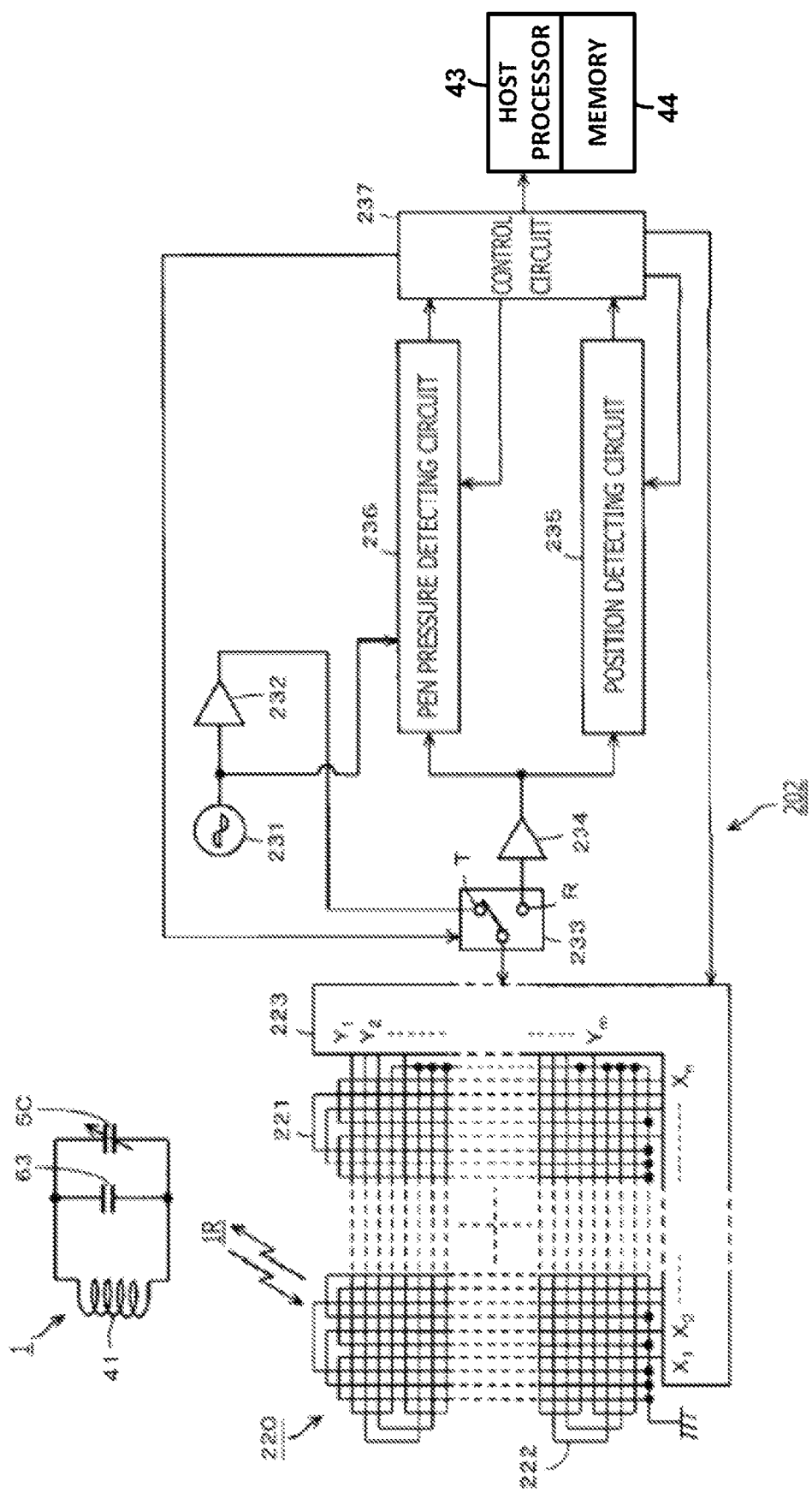
FIG. 2 is a diagram illustrating an example of an electronic circuit of an electronic pen and an electronic circuit of a position detecting device that is used together with the electronic pen according to one or more embodiments of the present disclosure.

FIG. 2 is a diagram illustrating examples of an electronic circuit of the electronic pen 1 and an electronic circuit of the position detecting device 202 that is used together with the electronic pen 1. As illustrated in FIG. 2, in the electronic pen 1, end portions of a coil 41 and a capacitor 63 are connected to each other, to thereby form a parallel resonance circuit 1R. In addition, a variable capacitor 5C that is part of a pressure detector is electrically connected in parallel with the resonance circuit 1R. When a pressure (pen pressure) is applied to the distal end portion 12 (see FIG. 1), the capacitance of the variable capacitor 5C changes, and thus depends on the pressure (pen pressure) that is applied to the distal end portion 12 of the core body 13.

The electromagnetic induction position detecting device 202 transmits a signal to the electronic pen 1 by electromagnetic coupling, and the electronic pen 1 feeds back the signal received from the position detecting device 202 through the resonance circuit 1R. The position detecting device 202 receives the feedback signal from the resonance circuit 1R of the electronic pen 1 by electromagnetic coupling. The position detecting device 202 detects a position on a sensor 220 indicated by the electronic pen 1 from a position on the sensor 220 at which the received signal is detected. The position detecting device 202 detects a phase change of the signal received from the resonance circuit 1R of the electronic pen 1 by electromagnetic coupling to detect a change in resonance frequency, to thereby detect pen pressure applied to the core body 13 of the electronic pen 1.

The sensor 220 of the position detecting device 202 includes an X-axis direction loop coil group 221 and a Y-axis direction loop coil group 222, which are stacked on top of each other with an electrical insulator material interposed between them. Further, the position detecting device 202 includes a selection circuit 223 to which the X-axis direction loop coil group 221 and the Y-axis direction loop coil group 222 are connected. The selection circuit 223 successively selects one of the two loop coil groups 221 and 222.

Further, the position detecting device 202 includes an oscillator 231, a current driver 232, a switching circuit 233, a reception amplifier 234, a position detecting circuit 235, a pen pressure detecting circuit 236, and a control circuit 237. The control circuit 237 includes a microcomputer having a processor and a memory storing instructions that, when executed by the processor, cause the microcomputer to perform the functions of the control circuit 237 described herein. The control circuit 237 controls loop coil selection by the selection circuit 223 and switching by the switching circuit 233, and controls timing of processing by the position detecting circuit 235 and the pen pressure detecting circuit 236.

The oscillator 231 generates an alternate current (AC) signal having a frequency f0. Moreover, the oscillator 231 supplies the generated AC signal to the current driver 232 and the pen pressure detecting circuit 236. The current driver 232 converts the AC signal supplied from the oscillator 231 into current, and sends the current to the switching circuit 233. The switching circuit 233 switches, under control by the control circuit 237, a connection destination to which a loop coil selected by the selection circuit 223 is connected (transmission-side terminal T or reception-side terminal R). Of the connection destinations, the current driver 232 is connected to the transmission-side terminal T, and the reception amplifier 234 is connected to the reception-side terminal R.

An induced voltage that is generated at the loop coil selected by the selection circuit 223 is sent to the reception amplifier 234 through the selection circuit 223 and the switching circuit 233. The reception amplifier 234 amplifies the induced voltage supplied from the loop coil, and sends the resultant to the position detecting circuit 235 and the pen pressure detecting circuit 236.

At each loop coil of the X-axis direction loop coil group 221 and the Y-axis direction loop coil group 222, an induced voltage is generated with a radio wave that is transmitted from the electronic pen 1. The position detecting circuit 235 detects an induced voltage generated at each loop coil, specifically, a received signal, and converts the detection output signal into a digital signal to output the digital signal to the control circuit 237. The control circuit 237 calculates a coordinate value of an indicated position in the X-axis direction and the Y-axis direction of the electronic pen 1 based on the digital signal from the position detecting circuit 235, specifically, the voltage value level of the induced voltage generated at each loop coil.

Meanwhile, the pen pressure detecting circuit 236 synchronously detects the output signal from the reception amplifier 234 with the AC signal from the oscillator 231 to obtain a signal at a level depending on a phase difference (frequency shift) therebetween, and converts the signal depending on the phase difference (frequency shift) into a digital signal to output the digital signal to the control circuit 237. The control circuit 237 detects the pen pressure applied to the electronic pen 1 based on of the level of the digital signal from the pen pressure detecting circuit 236, specifically, the signal depending on the phase difference (frequency shift) between the transmitted radio wave and the received radio wave.

The control circuit 237 provides data to the host processor 43 of the electronic device 200. A memory 44 stores instructions that, when executed by the host processor 43, cause the host processor 43 to perform the functions of the host processor 43 described herein. More particularly, for each position determined by the control circuit 237, the control circuit 237 outputs coordinates (e.g., in real time) with respect to the sensor 220 and a corresponding pressure value. The host processor 43 obtains the coordinates and corresponding pressure values from the control circuit 237 and then maps the coordinates with respect to the sensor 220 (i.e., sensor coordinates) to coordinates with respect to the display screen 200D (i.e., display screen coordinates) based on the pressure values, as described below. In one or more embodiments, the host processor 43 causes a cursor to be displayed based on the coordinate with respect to the display screen 200D.

Other technologies for pen and/or pressure sensing sensor surfaces are presently known. For example, some sensor surfaces incorporate pressure-sensitive or analog-resistive film technologies that identify pen activity based on changes in pressure on the sensor surface caused at a point of contact by the pen tip on the sensor surface. Other types of sensor surfaces incorporate analog surface capacitive or projected capacitive technologies in which pen activity is identified using sensors that detect minor changes in electrical current or electrostatic capacitance caused by the pen. Other examples of sensor surfaces incorporate surface acoustic wave technology that uses attenuation in ultrasound elastic waves on the surface to detect the position of a pen tip contacting the surface. Further examples of sensor surfaces incorporate optical technologies such as projection and reflection of infrared light where triangulation can be used to determine the position of a pen tip relative to the surface. Yet other sensor surfaces incorporate electromagnetic induction technologies that use sensors to detect changes in a magnetic field caused by interaction of a pen with the sensor surface. The present disclosure contemplates that any of the foregoing technologies, combinations of the foregoing technologies, or yet further developed technologies that enable pressure sensitive pen input on a surface, may be used in embodiments of the disclosure.

Figure 3:
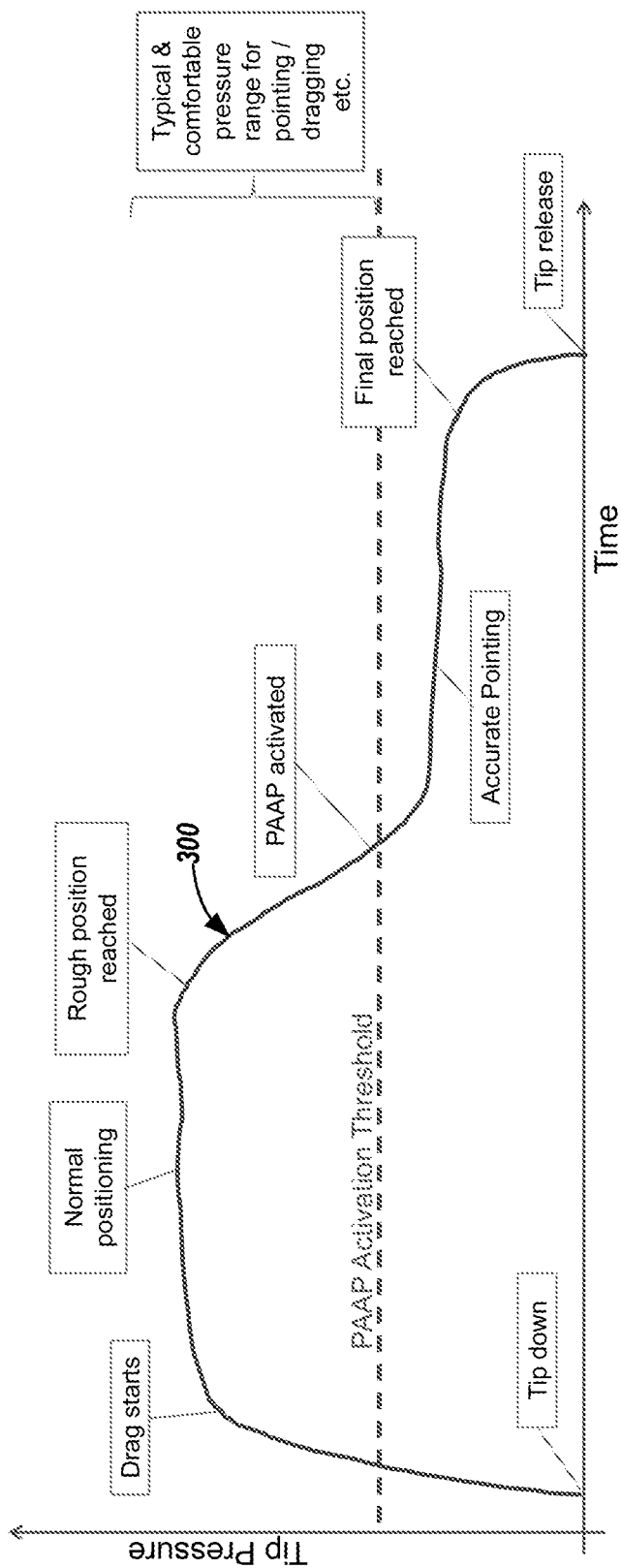
FIG. 3 is a diagram illustrating a basic pressure curve over time for an operator using a basic PAAP mechanism with a low threshold for accurate pointing according to one or more embodiments of the present disclosure.

FIG. 3 is a diagram illustrating a basic pressure curve 300 over time for an operator using a basic Pressure Activated Accurate Pointing (PAAP) mechanism with a low threshold for accurate pointing. The low threshold means every pointing operation will be affected. Initially, an operator performs a tip down operation by placing the pen tip 12 of the core body 13 of the electronic pen 1 on a surface of the sensor 220 (e.g., display screen 200D), and the host processor 43 maps sensor coordinates to display screen coordinates using a normal mapping method. The operator then performs a drag operation while increasing the pressure applied to the pen tip 12 of the electronic pen 1. Next, the operator performs a positioning operation while applying a nearly constant amount of pressure on the pen tip 12 of the electronic pen 1. As the pen tip 12 approaches a final position on the sensor 220, the operator begins to apply less pressure to the pen tip 12 of the electronic pen 1. When the pressure applied to the pen tip 12 of the electronic pen 1 drops below a PAAP activation threshold, the host processor 43 begins mapping sensor coordinates to display screen coordinates using a more accurate mapping method (e.g., similar to precision mode mapping). As the operator moves the pen tip 12 of the electronic pen 1 to a final position, the operator decreases the amount of pressure applied to the pen tip 12 of the electronic pen 1. Finally, the operator performs a tip release operation by moving the electronic pen 1 away from the sensor 220 such that no pressure is applied to the pen tip 12 of the electronic pen 1.

Figure 4:
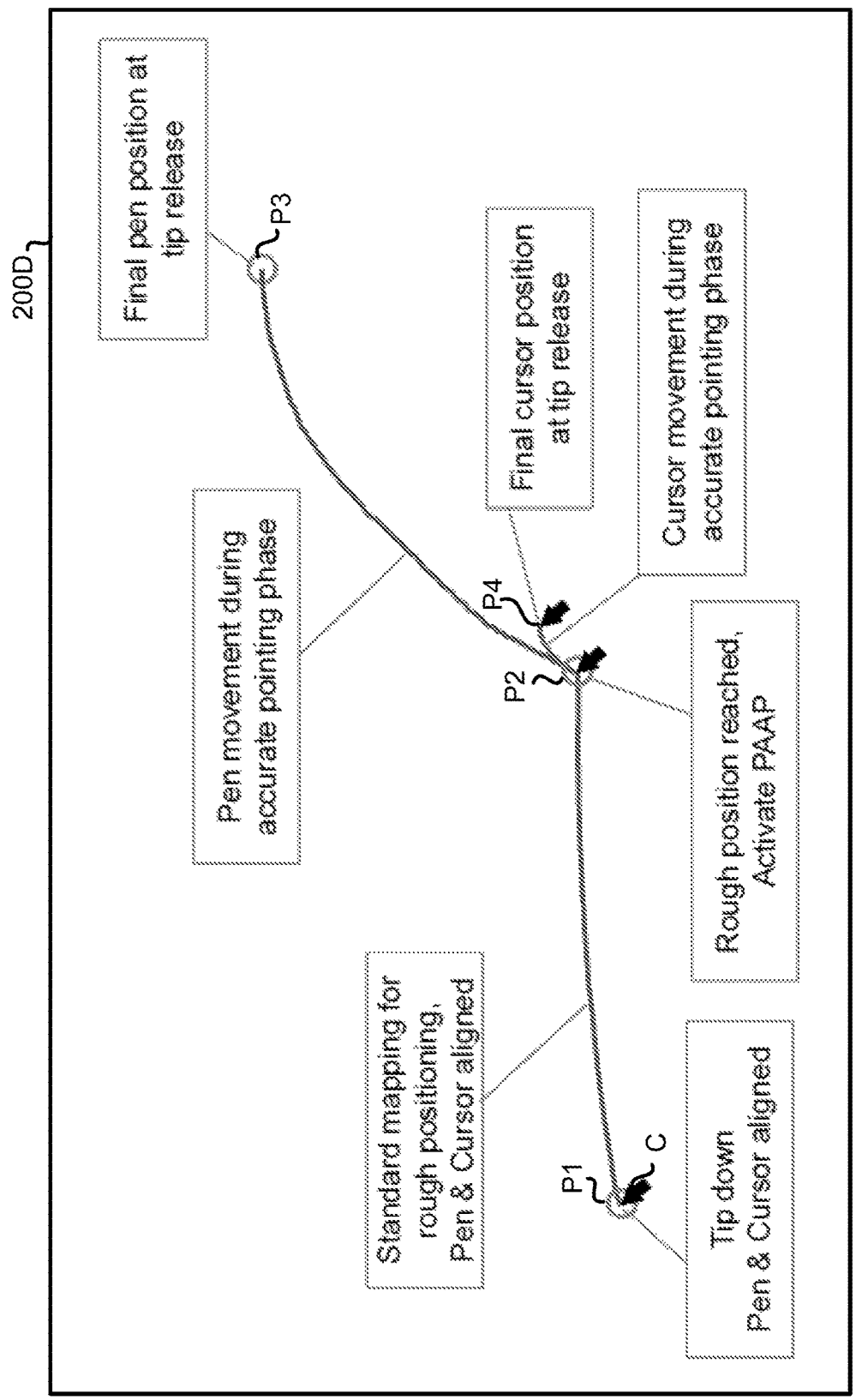
FIG. 4 is a diagram illustrating pen tip and cursor positions on a display screen as an operator performs input operations according to one or more embodiments of the present disclosure.

FIG. 4 is a diagram illustrating an example of pen tip and cursor positions on the display screen 200D as an operator performs input operations. FIG. 4 shows three circles labeled P1, P2, and P3, wherein the center of each of those circles indicates a position of the pen tip 12 of the electronic pen 1. Initially, while the host processor 43 maps sensor coordinates to display screen coordinates using a normal mapping method, an operator performs a tip down operation at the center of the circle labeled P1. The operator then moves the pen tip 12 of the electronic pen 1 to the center of the circle labeled P2. The host processor 43 causes a cursor icon C to be displayed. While the host processor 43 is mapping sensor coordinates to display screen coordinates using the normal mapping method, the cursor icon C is displayed at the same positions at which the sensor 220 detects the pen tip 12 of the electronic pen 1. In other words, with the normal mapping method, the position of the pen tip 12 of the electronic pen 1 is used as (i.e., mapped to) the position of the cursor icon C. In one or more embodiments, when the sensor 220 is used in a pen display that integrated with the display screen 200D, a sensing area of the sensor 220 and a display area of the display screen 200D have the same dimensions and, thus, a distance between the centers of the circles labeled P1 and P2 on the sensing area of the sensor 220 is equal to the distance between the centers of the circles labeled P1 and P2 on the display area of the display screen 200D. Additionally, a speed at which the pen tip 12 of the electronic pen 1 on the sensor 220 is moved across the sensor 220 is the same as a speed at which the cursor icon C is moved across the display screen 200D. In one or more embodiments, when the sensor 220 is used in a pen tablet that is external to the display screen 200D, the sensing area of the sensor 220 is smaller than the display area of the display screen 200D and, thus, a distance between the centers of the circles labeled P1 and P2 on the sensing area of the sensor 220 is less than the distance between the centers of the circles labeled P1 and P2 on the display area of the display screen 200D. Additionally, a speed at which the pen tip 12 of the electronic pen 1 on the sensor 220 is moved across the sensor 220 is less than a speed at which the cursor icon C is moved across the display screen 200D.

Next, the operator applies pressure to the pen tip 12 of the electronic pen 1, as described above in connection with FIG. 3, such that the more accurate mapping method is activated when the pen tip 12 of the electronic pen 1 reaches the center of the circle labeled P2. The operator moves the pen tip 12 of the electronic pen 1 to the center of the circle labeled P3, and then performs a tip release operation. Because the host processor 43 is mapping sensor coordinates to display screen coordinates using the more accurate mapping method, the cursor icon C is not displayed at the same positions at the sensor 220 detects the pen tip 12 of the electronic pen 1. In other words, with the precision mapping method, the detected position of the pen tip 12 of the electronic pen 1 is not used as (i.e., mapped to) the position of the cursor icon C. Instead, the mapping of the pen tip positions to screen cursor positions is scaled by a scaling factor (e.g., 8). Accordingly, if the operator moves the pen tip 12 of the electronic pen 1 a distance 8 cm from the center of the circle labeled P2 to the center of the circle labeled P3, the position of the pen tip 12 of the electronic pen 1 is mapped to the position of the cursor icon C such that the cursor icon C moves only a distance of 1 cm, from the center of the circle labeled P2 to the position labeled P4. Additionally, a speed at which the pen tip 12 of the electronic pen 1 on the sensor 220 is moved across the sensor 220 is the greater than a speed at which the cursor icon C is moved across the display screen 200D. Because a relatively large movement of the pen tip 12 of the electronic pen 1 results in a relative small movement of the cursor icon C, the operator can more precisely control position of the cursor icon C when the operator desires to move the cursor icon C a small distance.

Figure 5:
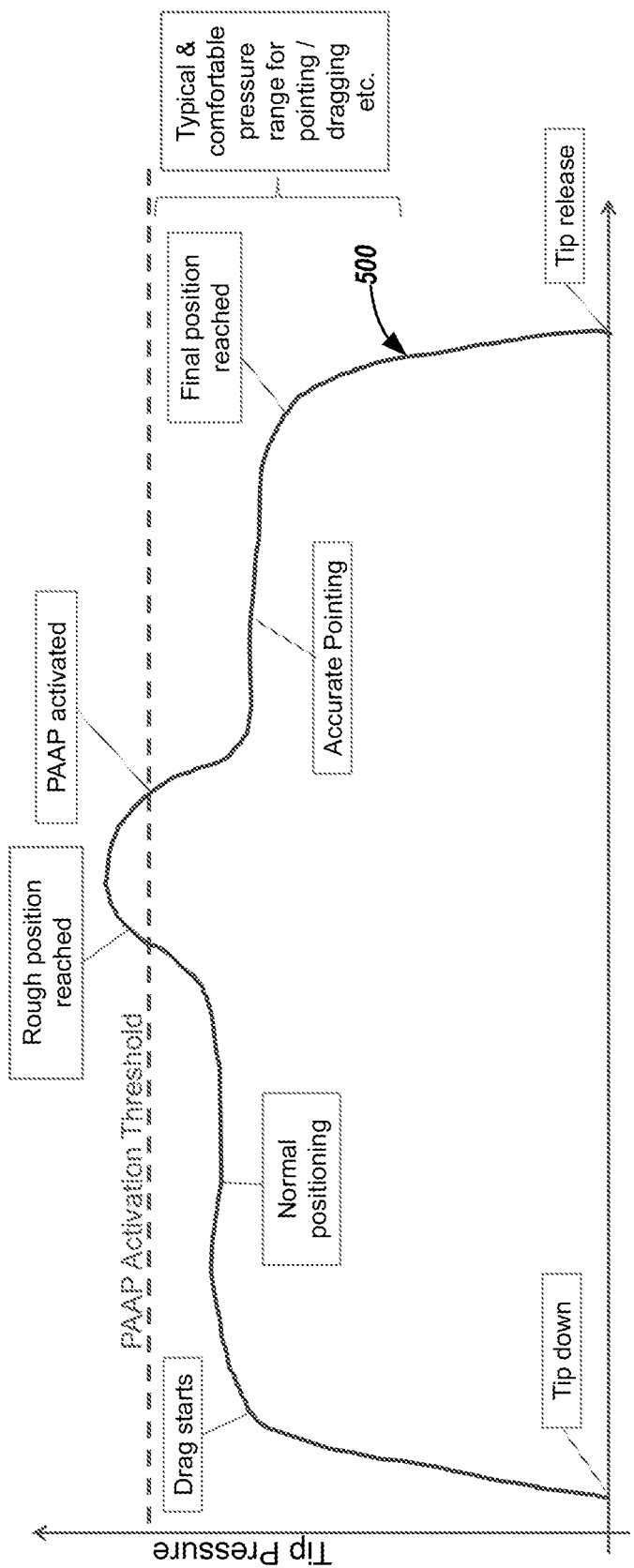
FIG. 5 is a diagram illustrating a basic pressure curve over time for an operator using a basic PAAP mechanism with a high threshold for accurate pointing according to one or more embodiments of the present disclosure.

FIG. 5 is a diagram illustrating a basic pressure curve 500 over time for an operator using a basic PAAP mechanism with a high threshold for accurate pointing. The basic pressure curve 400 shown in FIG. 4 is similar in many relevant respects to the basic pressure curve 300 shown in FIG. 3, except that the PAAP activation threshold shown in FIG. 4 is higher than the PAAP activation threshold shown in FIG. 3. The high threshold enables an operator to choose to activate more accurate mapping as needed by pressing a little harder after reaching a rough target position, and to not activate precision mapping if it is not needed. Also, using such a PAAP activation threshold enables the operator to work in the operator's normal/comfortable pressure range for accurate pointing, which helps the operator to feel in control of the position of the cursor icon.

Figure 6:
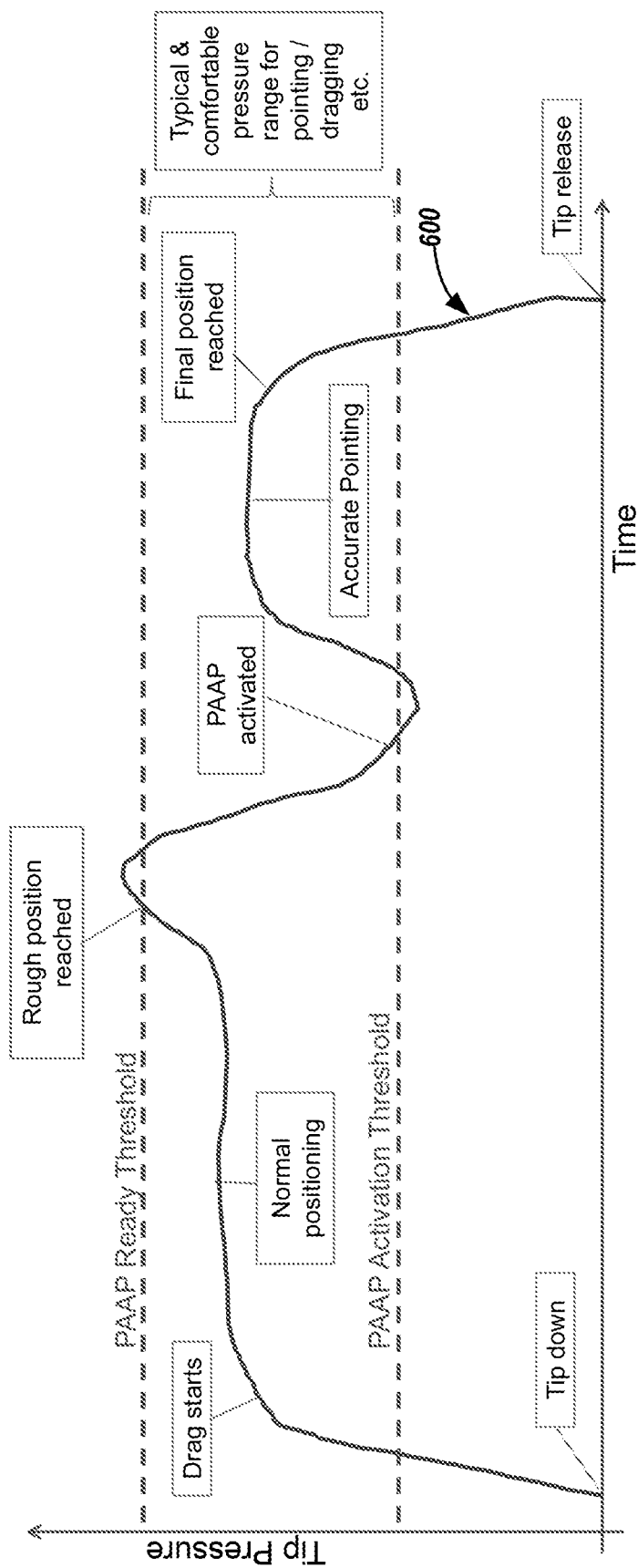
FIG. 6 is a diagram illustrating a basic pressure curve for a PAAP mechanism that uses two pressure thresholds for accurate pointing according to one or more embodiments of the present disclosure.

FIG. 6 is a diagram illustrating a basic pressure curve 600 for a PAAP mechanism that uses two pressure thresholds for accurate pointing. Initially, an operator performs a tip down operation by placing the pen tip 12 of the core body 13 of the electronic pen 1 on the sensor 220 (e.g., on a surface of the display screen 200D), and the host processor 43 maps sensor coordinates to display screen coordinates using a normal mapping method. The operator then increases the pressure applied to the pen tip 12 of the electronic pen 1, such that the pressure applied to the pen tip 12 of the electronic pen 1 exceeds a PAAP activation threshold (i.e., first threshold pressure value). Next, the operator performs a positioning operation while applying a nearly constant amount of pressure on the pen tip 12 of the electronic pen 1. As the operator decides to utilize the PAAP accurate pointing function for the cursor position, the operator briefly applies more pressure to the pen tip 12 of the electronic pen 1, such that the pressure applied to the pen tip 12 of the electronic pen 1 exceeds a PAAP ready threshold (i.e., second threshold pressure value). When the pen tip 12 approaches a rough position, which is close to a final position on the sensor 220, the operator drops the pressure applied to the pen tip 12 of the electronic pen 1 below the PAAP activation threshold and the host processor 43 begins mapping sensor coordinates to display screen coordinates using a more accurate mapping method (e.g., similar to the precision mode mapping). After the operator moves the pen tip 12 of the electronic pen 1 to the final position, the operator decreases the amount of pressure applied to the pen tip 12 of the electronic pen 1 and releases the tip pressure by moving the electronic pen 1 away from the sensor 220 such that no pressure is applied to the pen tip 12 of the electronic pen 1.

Figure 7:
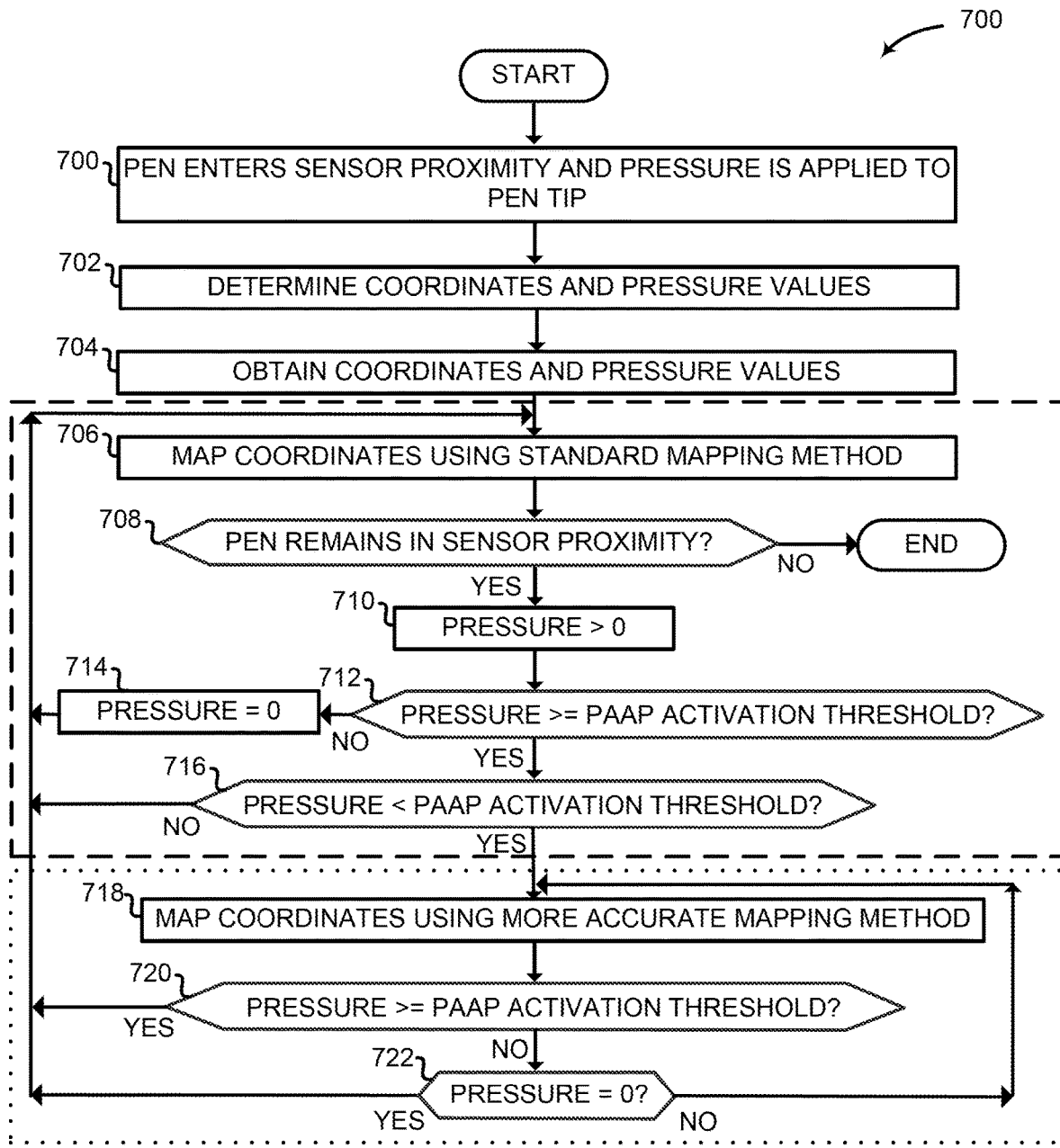
FIG. 7 is a diagram illustrating a flowchart of a method according to one or more embodiments of the present disclosure.

FIG. 7 is a diagram illustrating a flowchart of a method 700. The method 700 begins at 700 when the electronic pen 1 enters a proximity (e.g., 20 mm) of the sensor 220 and then the pen tip applies pressure to the sensor surface. While the electronic pen 1 is in proximity to the sensor 220, the sensor 220 is able to receive a signal transmitted from the electronic pen 1; while electronic pen 1 is in not proximity to the sensor 220, the sensor 220 is not able to receive the signal transmitted from the electronic pen 1. For example, an operator places the pen tip 12 of the electronic pen 1 onto the display screen 200D of the electronic device 200. The method 700 then proceeds to 702.

At 702, a plurality of sensor coordinates and corresponding pressure values are determined. For example, the position detecting circuit 235 and the pen pressure detecting circuit 236 of the position detecting device 202 determine the sensor coordinates and corresponding pressure values as described above in connection with FIG. 2. The method 700 then proceeds to 704.

At 704, the plurality of sensor coordinates and corresponding pressure values that are determined at 702 are obtained. For example, the host processor 43 obtains the plurality of sensor coordinates and corresponding pressure values from the control circuit 237 of the position detecting device 202. The method 700 then proceeds to 706.

At 706, one or more of the plurality of sensor coordinates obtained at 704 is mapping using a standard or normal mapping method to display screen coordinates. For example, the host processor 43 maps the one or more of the plurality of sensor coordinates obtained at 704 using the standard mapping method to display screen coordinates, as described above in connection with FIG. 3 when the operator moves the electronic pen 1 from the center of the circle labeled P1 to the center of the circle labeled P2. In one or more embodiments, the mapping performed at 706 includes displaying a cursor icon based on the resulting display screen coordinates. The method 700 then proceeds to 708.

At 708, a determination is made whether the electronic pen 1 remains in proximity to the sensor 220. For example, the control circuit 237 outputs no data to the host processor 43 when the electronic pen 1 is not in proximity to the sensor 220, and the host processor 43 determines whether the electronic pen 1 is currently in proximity to the sensor 220 based on whether data is currently being received from the host processor 43. If the electronic pen 1 is not determined to be in proximity to the sensor 220, the process 700 ends. If the electronic pen 1 is determined to be in proximity to the sensor 220, the process 700 proceeds to 710.

At 710, a pressure is applied to the pen tip 12 of the electronic pen 1. For example, the operator pushes the pen tip 12 of the electronic pen 1 against the display screen 200. The process 700 then proceeds to 712.

At 712, a determination is made whether the pressure applied to the pen tip 12 of the electronic pen 1 is greater than or equal to a PAAP activation threshold. For example, the host processor 43 determines whether the pressure applied to the pen tip 12 of the electronic pen 1 is greater than or equal to the PAAP activation threshold based on the pressure values obtained at 704. If the pressure applied to the pen tip 12 of the electronic pen 1 is not determined to be greater than or equal to the PAAP activation threshold, the method 700 proceeds to 714. If the pressure applied to the pen tip 12 of the electronic pen 1 is determined to be greater than or equal to the PAAP activation threshold, the method 700 proceeds to 716.

At 714, no pressure is applied to the pen tip 12 of the electronic pen 1. For example, the operator moves the pen tip 12 of the electronic pen 1 away from the display screen 200. The process 700 then returns to 706.

At 716, a determination is made whether the pressure applied to the pen tip 12 of the electronic pen 1 is less than the PAAP activation threshold. For example, the host processor 43 determines whether the pressure applied to the pen tip 12 of the electronic pen 1 is less than the PAAP activation threshold based on the pressure values obtained at 704. If the pressure applied to the pen tip 12 of the electronic pen 1 is not determined to be less than the PAAP activation threshold, the method returns to 706. If the pressure applied to the pen tip 12 of the electronic pen 1 is determined to be less than the PAAP activation threshold, the method 700 proceeds to 718.

At 718, one or more of the plurality of sensor coordinates obtained at 704 is mapped using a more accurate mapping method to display screen coordinates. For example, the host processor 43 maps the one or more of the plurality of sensor coordinates obtained at 704 using the more accurate mapping method to display screen coordinates, as described above in connection with FIG. 3 when the operator moves the electronic pen 1 from the center of the circle labeled P2 to the center of the circle labeled P3. In one or more embodiments, the mapping performed at 718 includes displaying a cursor icon based on the resulting display screen coordinates. Additionally, in some embodiments, the displaying includes displaying an enlarged area around (e.g., appearing "zoomed in" and centered on) a display coordinate corresponding to a sensor coordinate that is initially mapped at 718, which enables an operator to more precisely position the cursor icon at a desired location. The method 700 then proceeds to 720.

At 720, a determination is once again made whether the pressure applied to the pen tip 12 of the electronic pen 1 is greater than or equal to the PAAP activation threshold. For example, the host processor 43 determines whether the pressure applied to the pen tip 12 of the electronic pen 1 is greater than or equal to the PAAP activation threshold based on the pressure values obtained at 704. If the pressure applied to the pen tip 12 of the electronic pen 1 is determined to be greater than or equal to the PAAP activation threshold, the method 700 returns to 706 where standard mapping is used. If the pressure applied to the pen tip 12 of the electronic pen 1 is not determined to be greater than or equal to the PAAP activation threshold, the method 700 proceeds to 722.

At 722, a determination is made whether the pressure applied to the pen tip 12 of the electronic pen 1 is zero. For example, the host processor 43 determines whether the pressure applied to the pen tip 12 of the electronic pen 1 is zero based on the pressure values obtained at 704. If the pressure applied to the pen tip 12 of the electronic pen 1 is determined to be zero, the method 700 returns to 706 where standard mapping is used. If the pressure applied to the pen tip 12 of the electronic pen 1 is not determined to be zero, the method 700 returns to 718 and the more accurate mapping is continued.

In FIG. 7, a box with relative large dash marks surrounds acts that are associated with the standard mapping of sensor coordinates to display screen coordinates. In addition, a box with relative small dash marks surrounds acts that are associated with the more accurate mapping of sensor coordinates to display screen coordinates.

Figure 8:
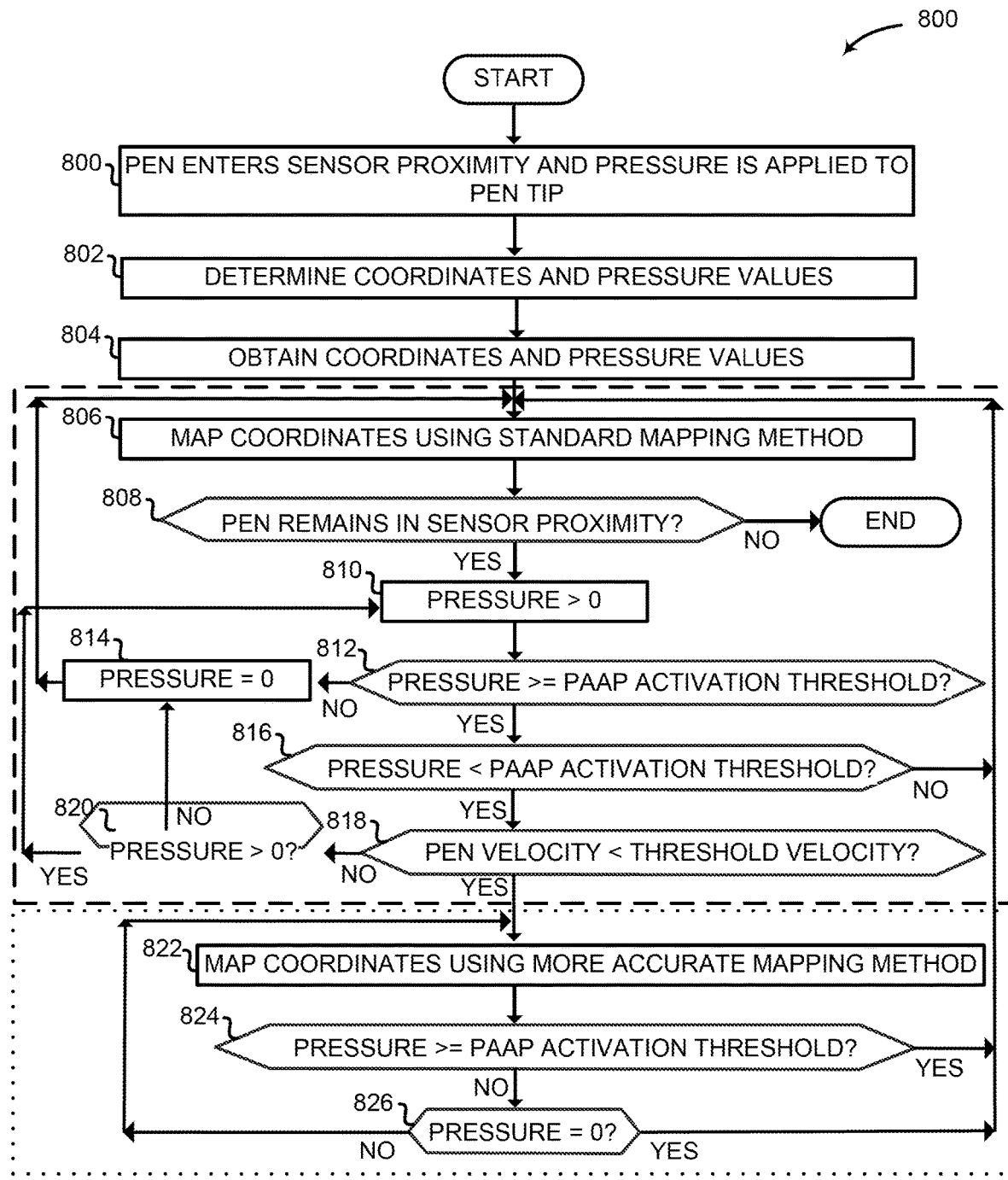
FIG. 8 is a diagram illustrating a flowchart of another method according to one or more embodiments of the present disclosure.

FIG. 8 is a diagram illustrating a flowchart of a method 800. The method 800 begins at 800 when the electronic pen 1 enters a proximity (e.g., 20 mm) of the sensor 220 and then the pen tip applies pressure to the sensor surface. For example, an operator places the pen tip 12 of the electronic pen 1 onto the display screen 200D of the electronic device 200. The method 800 then proceeds to 802.

At 802, a plurality of sensor coordinates and corresponding pressure values are determined. For example, the position detecting circuit 235 and the pen pressure detecting circuit 236 of the position detecting device 202 determine the sensor coordinates and corresponding pressure values as described above in connection with FIG. 2. The method 800 then proceeds to 804.

At 804, the plurality of sensor coordinates and corresponding pressure values that are determined at 802 are obtained. For example, the host processor 43 obtains the plurality of sensor coordinates and corresponding pressure values from the control circuit 237 of the position detecting device 202. The method 800 then proceeds to 806.

At 806, one or more of the plurality of sensor coordinates obtained at 804 is mapping using a standard mapping method to display screen coordinates. For example, the host processor 43 maps the one or more of the plurality of sensor coordinates obtained at 804 using the standard mapping method to display screen coordinates, as described above in connection with FIG. 3. The method 800 then proceeds to 808.

At 808, a determination is made whether the electronic pen 1 remains in proximity to the sensor 220. For example, the control circuit 237 outputs no data to the host processor 43 when the electronic pen 1 is not in proximity to the sensor 220, and the host processor 43 determines whether the electronic pen 1 is currently in proximity to the sensor 220 based on whether data is currently being received from the host processor 43. If the electronic pen 1 is not determined to be in proximity to the sensor 220, the process 800 ends. If the electronic pen 1 is determined to be in proximity to the sensor 220, the process 800 proceeds to 810.

At 810, a pressure is applied to the pen tip 12 of the electronic pen 1. For example, the operator pushes the pen tip 12 of the electronic pen 1 against the display screen 200. The process 800 then proceeds to 812.

At 812, a determination is made whether the pressure applied to the pen tip 12 of the electronic pen 1 is greater than or equal to a PAAP activation threshold. For example, the host processor 43 determines whether the pressure applied to the pen tip 12 of the electronic pen 1 is greater than or equal to the PAAP activation threshold based on the pressure values obtained at 804. If the pressure applied to the pen tip 12 of the electronic pen 1 is not determined to be greater than or equal to the PAAP activation threshold, the method 800 proceeds to 814. If the pressure applied to the pen tip 12 of the electronic pen 1 is determined to be greater than or equal to the PAAP activation threshold, the method 800 proceeds to 816.

At 814, no pressure is applied to the pen tip 12 of the electronic pen 1. For example, the operator moves the pen tip 12 of the electronic pen 1 away from the display screen 200. The process 800 then returns to 806.

At 816, a determination is made whether the pressure applied to the pen tip 12 of the electronic pen 1 is less than the PAAP activation threshold. For example, the host processor 43 determines whether the pressure applied to the pen tip 12 of the electronic pen 1 is less than the PAAP activation threshold based on the pressure values obtained at 804. If the pressure applied to the pen tip 12 of the electronic pen 1 is not determined to be less than the PAAP activation threshold, the method returns to 806. If the pressure applied to the pen tip 12 of the electronic pen 1 is determined to be less than the PAAP activation threshold, the method 800 proceeds to 818.

At 818, a determination is made whether a velocity of the electronic pen 1 is less than a threshold velocity value. For example, the host processor 43 determines whether the whether the velocity of the electronic pen 1 is less than the threshold velocity value based on the coordinates obtained at 804. In one or more embodiments, each pair of coordinates and corresponding pressure value is associated with a time value. The host processor 43 determines a distance between a starting coordinate and an ending coordinate (e.g., using stored data indicating a distance between individual coils of the X-axis direction loop coil group 221 of the sensor 220 and stored data indicating a distance between individual coils of the Y-axis direction loop coil group 222 of the sensor 220), determines a difference between a time value associated with the ending coordinate and a time value associated with the starting coordinate, and then determines the velocity of the electronic pen 1 by dividing the determined distance by the determined difference in time values. If the velocity of the electronic pen 1 is not determined to be less than the threshold velocity value, the method proceeds to 820. If the velocity of the electronic pen 1 is determined to be less than the threshold velocity value, the method 800 proceeds to 822.

At 820, a determination is made whether the pressure applied to the pen tip 12 of the electronic pen 1 is greater than zero. For example, the host processor 43 determines whether the pressure applied to the pen tip 12 of the electronic pen 1 is greater than zero based on the pressure values obtained at 804. If the pressure applied to the pen tip 12 of the electronic pen 1 is not determined to be greater than zero, the method 800 proceeds to 814. If the pressure applied to the pen tip 12 of the electronic pen 1 is determined to be greater zero, the method 800 returns to 806.

At 822, one or more of the plurality of sensor coordinates obtained at 804 is mapped using a more accurate mapping method to display screen coordinates. For example, the host processor 43 maps the one or more of the plurality of sensor coordinates obtained at 804 using the more accurate mapping method to display screen coordinates, as described above in connection with FIG. 3. The method 800 then proceeds to 824.

At 824, a determination is once again made whether the pressure applied to the pen tip 12 of the electronic pen 1 is greater than or equal to the PAAP activation threshold. For example, the host processor 43 determines whether the pressure applied to the pen tip 12 of the electronic pen 1 is greater than or equal to the PAAP activation threshold based on the pressure values obtained at 804. If the pressure applied to the pen tip 12 of the electronic pen 1 is determined to be greater than or equal to the PAAP activation threshold, the method 800 returns to 806 where standard mapping is used. If the pressure applied to the pen tip 12 of the electronic pen 1 is not determined to be greater than or equal to the PAAP activation threshold, the method 800 proceeds to 826.

At 826, a determination is made whether the pressure applied to the pen tip 12 of the electronic pen 1 is zero. For example, the host processor 43 determines whether the pressure applied to the pen tip 12 of the electronic pen 1 is zero based on the pressure values obtained at 804. If the pressure applied to the pen tip 12 of the electronic pen 1 is determined to be zero, the method 800 returns to 806 where standard mapping is used. If the pressure applied to the pen tip 12 of the electronic pen 1 is not determined to be zero, the method 800 returns to 822 and the more accurate mapping is continued.

In FIG. 8, a box with relative large dash marks surrounds acts that are associated with the standard mapping of sensor coordinates to display screen coordinates. In addition, a box with relative small dash marks surrounds acts that are associated with the more accurate mapping of sensor coordinates to display screen coordinates.

Figure 9:
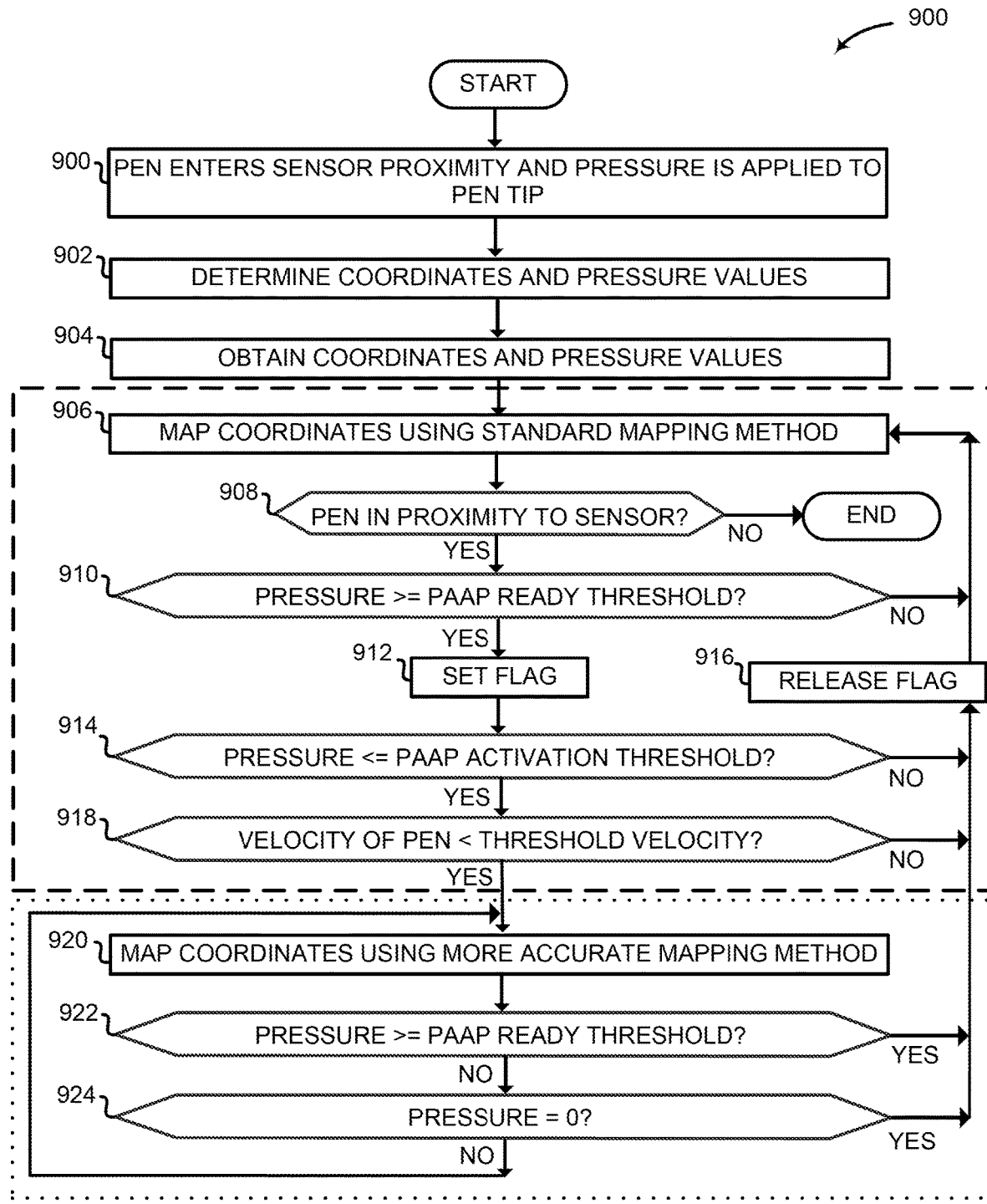
FIG. 9 is a diagram illustrating a flowchart of yet another method according to one or more embodiments of the present disclosure.

FIG. 9 is a diagram illustrating a flowchart of a method 900. The method 900 begins at 900 when the electronic pen 1 enters a proximity (e.g., 20 mm) of the sensor 220 and then the pen tip applies pressure to the sensor surface. For example, an operator places the pen tip 12 of the electronic pen 1 onto the display screen 200D of the electronic device 200. The method 900 then proceeds to 902.

At 902, a plurality of sensor coordinates and corresponding pressure values are determined. For example, the position detecting circuit 235 and the pen pressure detecting circuit 236 of the position detecting device 202 determine the sensor coordinates and corresponding pressure values as described above in connection with FIG. 2. The method 900 then proceeds to 904.

At 904, the plurality of sensor coordinates and corresponding pressure values that are determined at 902 are obtained. For example, the host processor 43 obtains the plurality of sensor coordinates and corresponding pressure values from the control circuit 237 of the position detecting device 202. The method 900 then proceeds to 906.

At 906, one or more of the plurality of sensor coordinates obtained at 904 is mapping using a standard mapping method to display screen coordinates. For example, the host processor 43 maps the one or more of the plurality of sensor coordinates obtained at 904 using the standard mapping method to display screen coordinates, as described above in connection with FIG. 3. The method 900 then proceeds to 908.

At 908, a determination is made whether the electronic pen 1 remains in proximity to the sensor 220. For example, the control circuit 237 outputs no data to the host processor 43 when the electronic pen 1 is not in proximity to the sensor 220, and the host processor 43 determines whether the electronic pen 1 is currently in proximity to the sensor 220 based on whether data is currently being received from the host processor 43. If the electronic pen 1 is not determined to be in proximity to the sensor 220, the process 900 ends. If the electronic pen 1 is determined to be in proximity to the sensor 220, the process 900 proceeds to 910.

At 910, a determination is made whether the pressure applied to the pen tip 12 of the electronic pen 1 is greater than or equal to a PAAP ready threshold. For example, the host processor 43 determines whether the pressure applied to the pen tip 12 of the electronic pen 1 is greater than or equal to the PAAP ready threshold based on the pressure values obtained at 904. If the pressure applied to the pen tip 12 of the electronic pen 1 is not determined to be greater than or equal to the PAAP ready threshold, the method 900 returns to 906. If the pressure applied to the pen tip 12 of the electronic pen 1 is determined to be greater than or equal to the PAAP ready threshold, the method 900 proceeds to 912.

At 912, a flag is set. For example, the host processor 43 set the value of a predetermined register or variable to a predetermined value (e.g., "1"). The method 900 then proceeds to 914.

At 914, a determination is made whether the pressure applied to the pen tip 12 of the electronic pen 1 is less than or equal to a PAAP activation threshold. For example, the host processor 43 determines whether the pressure applied to the pen tip 12 of the electronic pen 1 is less than or equal to the PAAP activation threshold based on the pressure values obtained at 904. If the pressure applied to the pen tip 12 of the electronic pen 1 is not determined to be less than or equal to the PAAP activation threshold, the method proceeds to 916. If the pressure applied to the pen tip 12 of the electronic pen 1 is determined to be less than or equal to the PAAP activation threshold, the method 900 proceeds to 918.

At 916, the flag that was set at 912 is released. For example, the host processor 43 set the value of the predetermined register or variable to a predetermined value (e.g., "0"). The method 900 then returns to 906.

At 918, a determination is made whether a velocity of the electronic pen 1 is less than a threshold velocity value. For example, the host processor 43 determines whether the whether the velocity of the electronic pen 1 is less than the threshold velocity value based on the coordinates obtained at 904. In one or more embodiments, each pair of coordinates and corresponding pressure value is associated with a time value. The host processor 43 determines a distance between a starting coordinate and an ending coordinate, determines a difference between a time value associated with the ending coordinate and a time value associated with the starting coordinate, and then determines the velocity of the electronic pen 1 by dividing the determined distance by the determined difference in time values. If the velocity of the electronic pen 1 is not determined to be less than the threshold velocity value, the method proceeds to 916. If the velocity of the electronic pen 1 is determined to be less than the threshold velocity value, the method 900 proceeds to 920.

At 920, one or more of the plurality of sensor coordinates obtained at 904 is mapped using a more accurate mapping method to display screen coordinates. For example, the host processor 43 maps the one or more of the plurality of sensor coordinates obtained at 904 using the more accurate mapping method to display screen coordinates, as described above in connection with FIG. 3. The method 900 then proceeds to 922.

At 922, a determination is made whether the pressure applied to the pen tip 12 of the electronic pen 1 is greater than or equal to the PAAP ready threshold. For example, the host processor 43 determines whether the pressure applied to the pen tip 12 of the electronic pen 1 is greater than or equal to the PAAP ready threshold based on the pressure values obtained at 904. If the pressure applied to the pen tip 12 of the electronic pen 1 is determined to be greater than or equal to the PAAP ready threshold, the method 900 proceeds to 916. If the pressure applied to the pen tip 12 of the electronic pen 1 is not determined to be greater than or equal to the PAAP ready threshold, the method 900 proceeds to 924.

At 924, a determination is made whether the pressure applied to the pen tip 12 of the electronic pen 1 is zero. For example, the host processor 43 determines whether the pressure applied to the pen tip 12 of the electronic pen 1 is zero based on the pressure values obtained at 904. If the pressure applied to the pen tip 12 of the electronic pen 1 is determined to be zero, the method 900 proceeds to 916 where the standard mapping is used. If the pressure applied to the pen tip 12 of the electronic pen 1 is not determined to be zero, the method 900 returns to 920 and the more accurate mapping is continued.

In FIG. 9, a box with relative large dash marks surrounds acts that are associated with the standard mapping of sensor coordinates to display screen coordinates. In addition, a box with relative small dash marks surrounds acts that are associated with the more accurate mapping of sensor coordinates to display screen coordinates.

The various embodiments described above can be combined to provide further embodiments. Aspects of the embodiments can be modified, if necessary to employ concepts of the various patents, applications and publications to provide yet further embodiments. For example, the processing discussed above that is performed by the host controller 43 may be performed by the control circuit 237 of the position detecting device 202.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    obtaining a plurality of sensor coordinates, and a plurality of pressure values respectively corresponding to the plurality of sensor coordinates, wherein the plurality of sensor coordinates corresponds to a plurality of positions on a sensor pointed to by an electronic pen, and the plurality of pressure values corresponds to a plurality of pressures applied to a pen tip of the electronic pen;
    mapping, using a first mapping method, a first set of the plurality of sensor coordinates to a first plurality of display screen coordinates;

outputting the first plurality of display screen coordinates;

determining that a first one of the plurality of pressure values is greater than or equal to a threshold pressure value;

determining that a second one of the plurality of pressure values is less than the threshold pressure value, after the determining that the first one of the plurality of pressure values is greater than or equal to the threshold pressure value;

in response to the determining that the second one of the plurality of pressure values is less than the threshold pressure value, determining that a velocity of the electronic pen is less than a threshold velocity value;

in response to the determining that the velocity of the electronic pen is less than the threshold velocity value, mapping, using a second mapping method, a second set of the plurality of sensor coordinates to a second plurality of display screen coordinates, wherein the second mapping method is different from the first mapping method, and the second set of the plurality of sensor coordinates is different from the first set of the plurality of sensor coordinates; and outputting the second plurality of display screen coordinates.

2. The method according to claim 1, wherein:

the first set of the plurality of sensor coordinates, which is mapped using the first mapping method to the first plurality of display screen coordinates, indicates that the electronic pen moves a first distance on the sensor, the first plurality of display screen coordinates corresponds to a first distance on the display screen, the first distance on the sensor is less than or equal to the first distance on the display screen, the second set of the plurality of sensor coordinates, which is mapped using the second mapping method to the second plurality of display screen coordinates, indicates that the electronic pen moves a second distance on the sensor, the second plurality of display screen coordinates corresponds to a second distance on the display screen, and the second distance on the sensor is greater than the second distance on the display screen.

3. The method according to claim 1, further comprising:

determining that a third one of the plurality of pressure values is greater than or equal to the threshold pressure value, after the determining that the second one of the plurality of pressure values is less than the threshold pressure value;

in response to the determining that the third one of the plurality of pressure values is greater than or equal to the threshold pressure value, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

4. The method according to claim 1, further comprising:

determining that a third one of the plurality of pressure values is equal to zero, after the determining that the second one of the plurality of pressure values is less than the threshold pressure value;

in response to the determining that the third one of the plurality of pressure values is equal to zero, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

5. A method comprising:

obtaining a plurality of sensor coordinates, and a plurality of pressure values respectively corresponding to the plurality of sensor coordinates, wherein the plurality of sensor coordinates corresponds to a plurality of positions on a sensor pointed to by an electronic pen, and the plurality of pressure values corresponds to a plurality of pressures applied to a pen tip of the electronic pen;

mapping, using a first mapping method, a first set of the plurality of sensor coordinates to a first plurality of display screen coordinates;

outputting the first plurality of display screen coordinates;

determining that a first one of the plurality of pressure values is greater than or equal to a threshold pressure value;

determining that a second one of the plurality of pressure values is less than the threshold pressure value, after the determining that the first one of the plurality of pressure values is greater than or equal to the threshold pressure value;

in response to the determining that the second one of the plurality of pressure values is less than the threshold pressure value, mapping, using a second mapping method, a second set of the plurality of sensor coordinates to a second plurality of display screen coordinates, wherein the second mapping method is different from the first mapping method, and the second set of the plurality of sensor coordinates is different from the first set of the plurality of sensor coordinates;

outputting the second plurality of display screen coordinates;

displaying a cursor on the display screen based on the first plurality of display screen coordinates; and displaying the cursor on the display screen based on the second plurality of display screen coordinates, wherein:

the first set of the plurality of sensor coordinates, which is mapped using the first mapping method to the first plurality of display screen coordinates, indicates that the electronic pen moves at a first velocity on the sensor, the displaying of the cursor on the display screen based on the first plurality of display screen coordinates includes moving the cursor at a first velocity on the display screen, the first velocity at which the electronic pen moves on the sensor is less than or equal to the first velocity at which the cursor moves on the display screen, the second set of the plurality of sensor coordinates, which is mapped using the second mapping method to the second plurality of display screen coordinates, indicates that the electronic pen moves at a second velocity on the sensor, the displaying of the cursor on the display screen based on the second plurality of display screen coordinates includes moving the cursor at a second velocity on the display screen, and the second velocity at which the electronic pen moves on the sensor is greater than the second velocity at which the cursor moves on the display screen.

6. A method comprising:
obtaining a plurality of sensor coordinates, and a plurality of pressure values respectively corresponding to the plurality of sensor coordinates, wherein the plurality of sensor coordinates corresponds to a plurality of positions on a sensor pointed to by an electronic pen, and the plurality of pressure values corresponds to a plurality of pressures applied to a pen tip of the electronic pen;
mapping, using a first mapping method, a first set of the plurality of sensor coordinates to a first plurality of display screen coordinates;
outputting the first plurality of display screen coordinates;
determining that a first one of the plurality of pressure values is greater than or equal to a first threshold pressure value;
determining that a second one of the plurality of pressure values is less than or equal to a second threshold pressure value, after the determining that the first one of the plurality of pressure values is greater than or equal to the first threshold pressure value, wherein the second threshold pressure value is less than the first threshold pressure value;
in response to the determining that the second one of the plurality of pressure values is less than or equal to the second threshold pressure value, mapping, using a second mapping method, a second set of the plurality of sensor coordinates to a second plurality of display screen coordinates, wherein the second mapping method is different from the first mapping method, and the second set of the plurality of sensor coordinates is different from the first set of the plurality of sensor coordinates; and
outputting the second plurality of display screen coordinates,
wherein:
   the first set of the plurality of sensor coordinates, which is mapped using the first mapping method, to the first plurality of display screen coordinates, indicates that the electronic pen moves a first distance on the sensor,
   the first plurality of display screen coordinates corresponds to a first distance on the display screen,
   the first distance on the sensor is less than or equal to the first distance on the display screen,
   the second set of the plurality of sensor coordinates, which is mapped using the second mapping method to the second plurality of display screen coordinates, indicates that the electronic pen moves a second distance on the sensor,
   the second plurality of display screen coordinates corresponds to a second distance on the display screen, and
   the second distance on the sensor is greater than the second distance on the display screen.

7. The method according to claim 6, further comprising:
in response to the determining that the second one of the plurality of pressure values is less than or equal to the second threshold pressure value, determining that a velocity of the electronic pen is less than a threshold velocity value,
wherein the mapping, using the second mapping method, of the second set of the plurality of sensor coordinates to the second plurality of display screen coordinates is in response to the determining that the second one of the plurality of pressure values is less than or equal to the second threshold pressure value and in response to the determining that the velocity of the electronic pen is less than the threshold velocity value.

8. The method according to claim 6, further comprising:
determining that a third one of the plurality of pressure values is greater than or equal to the first threshold pressure value, after the determining that the second one of the plurality of pressure values is less than or equal to the second threshold pressure value;
in response to the determining that the third one of the plurality of pressure values is greater than or equal to the first threshold pressure value, mapping, using the first mapping method, a third set of the plurality of sensor coordinates to a third plurality of display screen coordinates, wherein the third set of the plurality of sensor coordinates is different from the first set and the second set of the plurality of sensor coordinates; and
outputting the third plurality of display screen coordinates.

9. A method comprising:
obtaining a plurality of sensor coordinates, and a plurality of pressure values respectively corresponding to the plurality of sensor coordinates, wherein the plurality of sensor coordinates corresponds to a plurality of positions on a sensor pointed to by an electronic pen, and the plurality of pressure values corresponds to a plurality of pressures applied to a pen tip of the electronic pen;
mapping, using a first mapping method, a first set of the plurality of sensor coordinates to a first plurality of display screen coordinates;
outputting the first plurality of display screen coordinates;
determining that a first one of the plurality of pressure values is greater than or equal to a first threshold pressure value;
determining that a second one of the plurality of pressure values is less than or equal to a second threshold pressure value, after the determining that the first one of the plurality of pressure values is greater than or equal to the first threshold pressure value, wherein the second threshold pressure value is less than the first threshold pressure value;
in response to the determining that the second one of the plurality of pressure values is less than or equal to the second threshold pressure value, mapping, using a second mapping method, a second set of the plurality of sensor coordinates to a second plurality of display screen coordinates, wherein the second mapping method is different from the first mapping method, and the second set of the plurality of sensor coordinates is different from the first set of the plurality of sensor coordinates;
outputting the second plurality of display screen coordinates;
displaying a cursor on the display screen based on the first plurality of display screen coordinates; and
displaying the cursor on the display screen based on the second plurality of display screen coordinates,
wherein:
   the first set of the plurality of sensor coordinates, which is mapped using the first mapping method to the first plurality of display screen coordinates, indicates that the electronic pen moves at a first velocity on the sensor,
   the displaying of the cursor on the display screen based on the first plurality of display screen coordinates includes moving the cursor at a first velocity on the display screen, the first velocity at which the electronic pen moves on the sensor is less than equal to the first velocity at which the cursor moves on the display screen, the second set of the plurality of sensor coordinates, which is mapped using the second mapping method to the second plurality of display screen coordinates, indicates that the electronic pen moves at a second velocity on the sensor, the displaying of the cursor on the display screen based on the second plurality of display screen coordinates includes moving the cursor at a second velocity on the display screen, and the second velocity at which the electronic pen moves on the sensor is greater than the second velocity at which the cursor moves on the display screen.

10. A method comprising:

obtaining a plurality of sensor coordinates, and a plurality of pressure values respectively corresponding to the plurality of sensor coordinates, wherein the plurality of sensor coordinates corresponds to a plurality of positions on a sensor pointed to by an electronic pen, and the plurality of pressure values corresponds to a plurality of pressures applied to a pen tip of the electronic pen;

mapping, using a first mapping method, a first set of the plurality of sensor coordinates to a first plurality of display screen coordinates;

outputting the first plurality of display screen coordinates;

determining that a first one of the plurality of pressure values is greater than or equal to a first threshold pressure value;

determining that a second one of the plurality of pressure values is less than or equal to a second threshold pressure value, after the determining that the first one of the plurality of pressure values is greater than or equal to the first threshold pressure value, wherein the second threshold pressure value is less than the first threshold pressure value;

in response to the determining that the second one of the plurality of pressure values is less than or equal to the second threshold pressure value, mapping, using a second mapping method, a second set of the plurality of sensor coordinates to a second plurality of display screen coordinates, wherein the second mapping method is different from the first mapping method, and the second set of the plurality of sensor coordinates is different from the first set of the plurality of sensor coordinates;

outputting the second plurality of display screen coordinates;

determining that a third one of the plurality of pressure values is equal to zero, after the determining that the second one of the plurality of pressure values is less than or equal to the second threshold pressure value;

in response to the determining that the third one of the plurality of pressure values is equal to zero, mapping, using the first mapping method, a third set of the plurality of sensor coordinates to a third plurality of display screen coordinates, wherein the third set of the plurality of sensor coordinates is different from the first set and the second set of the plurality of sensor coordinates; and outputting the third plurality of display screen coordinates.

11. A non-transitory processor-readable storage medium storing instructions that, when executed by a processor, cause the processor to:

obtain a plurality of sensor coordinates, and a plurality of pressure values respectively corresponding to the plurality of sensor coordinates;

map, using a first mapping method, a first set of the plurality of sensor coordinates to a first plurality of display screen coordinates;

output the first plurality of display screen coordinates;

determine that a first one of the plurality of pressure values is greater than or equal to a threshold pressure value;

determine that a second one of the plurality of pressure values is less than the threshold pressure value, after the first one of the plurality of pressure values is determined to be greater than or equal to the threshold pressure value;

in response to the second one of the plurality of pressure values being determined to be less than the threshold pressure value, map, using a second mapping method, a second set of the plurality of sensor coordinates to a second plurality of display screen coordinates, wherein the second mapping method is different from the first mapping method, and the second set of the plurality of sensor coordinates is different from the first set of the plurality of sensor coordinates;

output the second plurality of display screen coordinates;

determine that a third one of the plurality of pressure values is equal to zero, after the second one of the plurality of pressure values is determined to be less than the threshold pressure value;

in response to the third one of the plurality of pressure values being determined to be equal to zero, map, using the first mapping method, a third set of the plurality of sensor coordinates to a third plurality of display screen coordinates, wherein the third set of the plurality of sensor coordinates is different from the first set and the second set of the plurality of sensor coordinates; and output the third plurality of display screen coordinates.

12. The storage medium according to claim 11, wherein the plurality of sensor coordinates corresponds to a plurality of positions on a sensor pointed to by an electronic pen, and the plurality of pressure values corresponds to a plurality of pressures applied to a pen tip of the electronic pen.

13. The storage medium according to claim 12, wherein the instructions, when executed by the processor, cause the processor to:

in response to the second one of the plurality of pressure values being determined to be less than the threshold pressure value, determine that a velocity of the electronic pen is less than a threshold velocity value, wherein the second set of the plurality of sensor coordinates is mapped, using the second mapping method, to the second plurality of display screen coordinates in response to in response to the second one of the plurality of pressure values being determined to be less than the threshold pressure value and the velocity of the electronic pen being determined to be less than the threshold velocity value.

14. The storage medium according to claim 12, wherein:

the first set of the plurality of sensor coordinates, which is mapped using the first mapping method to the first plurality of display screen coordinates, indicates that the electronic pen moves a first distance on the sensor, the first plurality of display screen coordinates corresponds to a first distance on the display screen, the first distance on the sensor is less than or equal to the first distance on the display screen, the second set of the plurality of sensor coordinates, which is mapped using the second mapping method to the second plurality of display screen coordinates, indicates that the electronic pen moves a second distance on the sensor, the second plurality of display screen coordinates corresponds to a second distance on the display screen, and the second distance on the sensor is greater than the second distance on the display screen.

15. The storage medium according to claim 12, wherein the instructions, when executed by the processor, cause the processor to:

display a cursor on the display screen based on the first plurality of display screen coordinates; and display the cursor on the display screen based on the second plurality of display screen coordinates, wherein:

the first set of the plurality of sensor coordinates, which is mapped using the first mapping method to the first plurality of display screen coordinates, indicates that the electronic pen moves at a first velocity on the sensor, the cursor is displayed on the display screen based on the first plurality of display screen coordinates by moving the cursor at a first velocity on the display screen, the first velocity at which the electronic pen moves on the sensor is less than or equal to the first velocity at which the cursor moves on the display screen, the second set of the plurality of sensor coordinates, which is mapped using the second mapping method to the second plurality of display screen coordinates, indicates that the electronic pen moves at a second velocity on the sensor, the cursor is displayed on the display screen based on the second plurality of display screen coordinates by moving the cursor at a second velocity on the display screen, and the second velocity at which the electronic pen moves on the sensor is greater than the second velocity at which the cursor moves on the display screen.

16. The storage medium according to claim 11, wherein the instructions, when executed by the processor, cause the processor to:

determine that a third one of the plurality of pressure values is greater than or equal to the threshold pressure value, after the second one of the plurality of pressure values is determined to be less than the threshold pressure value;

in response to the third one of the plurality of pressure values being determined to be greater than or equal to the threshold pressure value, map, using the first mapping method, a third set of the plurality of sensor coordinates to a third plurality of display screen coordinates, wherein the third set of the plurality of sensor coordinates is different from the first set and the second set of the plurality of sensor coordinates; and output the third plurality of display screen coordinates.

17. The storage medium according to claim 11, wherein the instructions, when executed by the processor, cause the processor to:

display a cursor on the display screen based on the first plurality of display screen coordinates; and display the cursor on the display screen based on the second plurality of display screen coordinates, wherein at least part of the display screen is displayed in an enlarged manner while the cursor is displayed on the display screen based on the second plurality of display screen coordinates compared to a manner in which the at least part of the display screen is displayed while the cursor is displayed on the display screen based on the first plurality of display screen coordinates.

* * * * *